United States Patent
Yamashita et al.

(10) Patent No.: US 10,501,650 B2
(45) Date of Patent: Dec. 10, 2019

(54) INK JET RECORDING METHOD AND INK JET RECORDING APPARATUS

(71) Applicant: CANON KABUSHIKI KAISHA, Tokyo (JP)

(72) Inventors: Tomohiro Yamashita, Yokohama (JP); Satoshi Kudo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/960,981

(22) Filed: Apr. 24, 2018

(65) Prior Publication Data
US 2018/0312706 A1    Nov. 1, 2018

(30) Foreign Application Priority Data

May 1, 2017    (JP) .................................. 2017-091054
Mar. 28, 2018    (JP) .................................. 2018-062012

(51) Int. Cl.
| | | |
|---|---|---|
| *C09D 11/324* | (2014.01) | |
| *B41J 2/155* | (2006.01) | |
| *B41J 2/045* | (2006.01) | |
| *C09D 11/322* | (2014.01) | |
| *B41J 2/38* | (2006.01) | |
| *C09D 11/328* | (2014.01) | |
| *B41J 2/21* | (2006.01) | |

(52) U.S. Cl.
CPC ........... *C09D 11/324* (2013.01); *B41J 2/0458* (2013.01); *B41J 2/04528* (2013.01); *B41J 2/04563* (2013.01); *B41J 2/155* (2013.01); *B41J 2/38* (2013.01); *C09D 11/322* (2013.01); *C09D 11/328* (2013.01); *B41J 2/2114* (2013.01); *B41J 2202/16* (2013.01); *B41J 2202/20* (2013.01)

(58) Field of Classification Search
CPC ...... B41J 2/38; B41J 2/04528; B41J 2/04563; B41J 2/155
See application file for complete search history.

(56) References Cited

U.S. PATENT DOCUMENTS

2017/0348972 A1    12/2017    Kudo et al.
2018/0147841 A1*    5/2018    Clark .................. B41J 2/04508

FOREIGN PATENT DOCUMENTS

| JP | 2008-000975 A | 1/2008 |
|---|---|---|
| JP | 2008-194940 A | 8/2008 |
| JP | 2010-143147 A | 7/2010 |

* cited by examiner

*Primary Examiner* — Julian D Huffman
(74) *Attorney, Agent, or Firm* — Venable LLP (57) ABSTRACT

An ink jet recording method uses an ink jet recording apparatus equipped with a line head that includes a plurality of recording element substrates each having a nozzle array comprised of a plurality of nozzles, which eject an aqueous ink, arranged in a predetermined direction. The recording element substrates are arranged in the predetermined direction such that each of the recording element substrates constitutes an overlapping portion at which a terminal portion of the recording element substrate is overlapped with a terminal portion of an adjacent recording element substrate in the predetermined direction. The method includes setting the average temperature To (° C.) of an ink ejected from overlapping-portion nozzles included in the overlapping portion of the nozzle array and the average temperature Tc (° C.) of an ink ejected from the center-portion nozzle included in the center portion of the nozzle array so as to satisfy the relationship Tc>To.

18 Claims, 5 Drawing Sheets

INK JET RECORDING METHOD AND INK JET RECORDING APPARATUS

BACKGROUND OF THE INVENTION

Field of the Invention

The present invention relates to an ink jet recording method and an ink jet recording apparatus used therefor.

Description of the Related Art

Ink jet recording apparatuses have recently been used increasingly in offices and the like with their advantages such as low electric power, low cost, and saved space. As a scanning type of a recording head used in ink jet recording apparatuses, a serial type can be given as one example. In the serial type, an image is recorded by moving a recording head in repetition in a direction (sub-scanning direction) orthogonal to a paper feed direction (main scanning direction). Since the serial type recording head is relatively small, the recording apparatus itself can have a reduced size.

In recent years, for further improvement in a recording speed (throughput), a recording apparatus using, as a recording head, a line head type in which an arrangement width of ejection orifices is increased to a width corresponding to the maximum width of a recording medium has been developed (Japanese Patent Application Laid-Open No. 2010-143147). In this line head type, as distinguished from the serial type, the recording head is not moved, and only paper is conveyed so that it is advantageous for improving a recording speed.

In the line head type, however, there may occur a problem that a "streak" appears on an image recorded at a discontinuous position of nozzle arrays at a boundary portion between recording element substrates (chips) placed adjacent to each other. To overcome such a problem, proposed is a recording head having a heater provided at a boundary between chips to eliminate a temperature difference between the chips (Japanese Patent Application Laid-Open No. 2008-194940). Provided also is an ink jet recording apparatus capable of reducing a temperature drop of chips at a joint portion between chip arrays and thereby suppressing a change in the density of an image recorded at the joint portion (Japanese Patent Application Laid-Open No. 2008-000975).

When ink jet recording apparatuses are used in offices, plain paper without a coating layer is typically used as recording media. In such a circumstance, the development of a system suited for recording on plain paper is strongly demanded. For example, to record an image on plain paper, inks and recording apparatuses are required to cause no deformation of a recording medium after recording (not to cause what is called cockling) or to enable recording of an image having an optical density suited for office use.

SUMMARY OF THE INVENTION

Problem to be Solved by the Invention

The inventors of the present invention have studied an image recording method of an image on plain paper using an ink jet recording apparatus with a line head. As a result, it has been revealed that deformation of a recording medium after recording (hereinafter also called "cockling") is likely to be caused depending on recording image patterns. When cockling is caused, a recording medium is forced to wait for a longer time for two-sided recording, for example, and thus the recording speed is likely to be decreased. In addition, a deformed recording medium is likely to come into contact with a recording head to be scratched, for example. It has also been revealed that even when a recording apparatus equipped with a recording head disclosed in Japanese Patent Application Laid-Open No. 2008-194940 or Japanese Patent Application Laid-Open No. 2008-000975 and other members is used, a recording medium after recording is likely to cause cockling.

An object of the invention is therefore to provide an ink jet recording method capable of suppressing the deformation of a recording medium (what is called cockling) and thereby recording a high-quality image when a recording apparatus equipped with a line head is used. Another object of the invention is to provide an ink jet recording apparatus to be used for the above-described ink jet recording method.

Means to Solve the Problems

The above-described objects are achieved by the following invention. According to the invention, provided is an ink jet recording method which records an image on a recording medium by using an ink jet recording apparatus equipped with a line head, wherein the line head has a plurality of recording element substrates each having a nozzle array comprised of a plurality of nozzles, which eject an aqueous ink, arranged in a predetermined direction, the recording element substrates are arranged in the predetermined direction such that the recording element substrate constitutes an overlapping portion at which the terminal portion of the recording element substrate is overlapped with the terminal portion of adjacent recording element substrate in the predetermined direction, an average temperature To (° C.) of an aqueous ink ejected from an overlapping-portion nozzle included in the overlapping portion of the nozzle array and an average temperature Tc (° C.) of an aqueous ink ejected from a center-portion nozzle included in a center portion of the nozzle array satisfy a relationship of Tc>To, and the aqueous ink is ejected from the overlapping-portion nozzles while the nozzles are allocated to an adjacent recording element substrate.

Effect of the Invention

The invention enables to provide an ink jet recording method capable of suppressing the deformation of a recording medium (what is called cockling) and thereby recording a high-quality image, when using a recording apparatus. In addition, the invention enables to provide an ink jet recording apparatus to be used for the above-described ink jet recording method.

Further features of the present invention will become apparent from the following description of exemplary embodiments with reference to the attached drawings.

BRIEF DESCRIPTION OF THE DRAWINGS

FIG. 3A and FIG. 3B schematically show one example of a line head, in which

FIG. 4A and FIG. 4B show one example of a recovery mechanism, in which

DESCRIPTION OF THE EMBODIMENTS

The invention will hereinafter be described in further detail with reference to preferred embodiments in accordance with the accompanying drawings.

In the invention, when a compound is a salt, the salt in an ink is dissociated into ions, but it is expressed "the ink contains a salt" for convenience sake. An aqueous ink for ink jet may be referred to as "ink" simply. The physical property values are values at normal temperature (25° C.) unless otherwise particularly specified.

<Ink Jet Recording Method>

An ink jet recording method of the invention is a method of recording an image on a recording medium by using an ink jet recording apparatus equipped with a line head. The line head is equipped with a plurality of recording element substrates each having a nozzle array comprised of a plurality of nozzles, which eject an aqueous ink, arranged in a predetermined direction, and the recording element substrates are arranged in the predetermined direction such that the recording element substrate constitutes an overlapping portion at which the terminal portion of the recording element substrate is overlapped with the terminal portion of adjacent recording element substrate in the predetermined direction. The average temperature To (° C.) of an aqueous ink ejected from an overlapping-portion nozzle included in the overlapping portion of the nozzle array and the average temperature Tc (° C.) of an aqueous ink ejected from a center-portion nozzle included in a center portion of the nozzle array satisfy the relationship, Tc>To. The aqueous ink is ejected from the overlapping-portion nozzles while the nozzles are allocated to an adjacent recording element substrate.

(Reason of Causing Cockling)

It has been revealed that when an ink jet recording apparatus equipped with a line head having such a structure as above is used to record an image, cockling is likely to be caused in certain conditions. To address this problem, the inventors of the present invention have studied why cockling is markedly caused when a line head is used. The head width of a typical line head is designed to cover the width of a recording medium, and an image is basically recorded by a single relative scanning (single pass). In other words, unlike a serial head, the recording head is not required to be moved in a direction orthogonal to the feeding direction of a recording medium (main scanning direction), but a larger amount of an ink is applied in a unit region at a time. To record a solid image or a similar image, the amount of an ink in a single application becomes especially large, and thus the recording medium is wetted at a time. A large amount of an ink applied at a time is thought to be one reason of being likely to cause cockling when a line head is used. Meanwhile, a serial head enables recording of an image while moving in a direction (sub scanning direction) orthogonal to the main scanning direction and enables multipath recording, and thus a region in the width direction of a recording medium is practically unlikely to be wetted at a time. The multipath recording is a technique of recording an image in each unit region by multiple times of scanning of a recording head and is effective in reducing the amount of an ink applied to a unit region at a time.

Next, the inventors of the present invention have studied how cockling is caused when a line head is used. When a cross section of a recorded product (recording medium) with cockling is observed, it has been revealed that the permeation depth of an ink periodically varies. Further observation has revealed that the cycle of the ink permeation depth corresponds to a discontinuous position of nozzle arrays in a boundary between recording element substrates (hereinafter also called "joint portion"). More specific observation of the ink permeation depth has revealed that the permeation depth of an ink ejected from nozzles around the joint portion is larger than the permeation depth of an ink ejected from nozzles far from the joint portion. In other words, it is assumed that a difference in the ink permeation depth due to nozzle positions causes a periodic variation in wet degree (swelling degree) of a recording medium to result in cockling as a wavy deformation.

(Reason of Larger Permeation Depth of Ink Ejected from Nozzles Around Joint Portion)

Next, the inventors of the present invention have studied why an ink ejected from nozzles around the joint portion of a line head causes a larger permeation depth. As described above, the joint portion is a discontinuous position of nozzle arrays in a boundary between recording element substrates. Typically, a plurality of recording element substrates are arranged in the same direction as the nozzle arranging direction so that nozzles at positions corresponding to a joint portion of adjacent recording element substrates overlap with each other in a direction intersecting the nozzle arranging direction to form an overlapping portion. The nozzles at the positions corresponding to the joint portion are typically controlled in such a manner as below to record an image.

The nozzles at the positions corresponding to the joint portion (i.e., overlapping-portion nozzles) are located in both adjacent recording element substrates. Hence, the nozzles for ejecting an ink are controlled to be allocated to adjacent recording element substrates, and thus the displacement of ink dot adhesion positions due to installation error of recording element substrates is unlikely to be recognized. As a result, a joint portion includes an ink ejected from an overlapping-portion nozzle of a recording element substrate allocated to a preceding recording and an ink ejected from an overlapping-portion nozzle of a recording element substrate allocated to the subsequent recording, and this generates a difference in permeation time. In other words, while permeation and fixation of a preceding ink are proceeding, the subsequent ink is applied. The subsequent ink adheres to a recording medium that has been wetted, thus the permeation is accelerated, and the ink is more likely to permeate in the depth direction of the recording medium. It is supposed that such a difference in permeation time is caused to increase the permeation depth of an ink ejected from nozzles in the joint portion as compared with the permeation depth of an ink ejected from nozzles in portions other than the joint portion, including a center portion.

(Means of Suppressing Cockling)

In consideration of the above results, the inventors of the present invention have further studied a means of suppressing cockling even when an ink jet recording apparatus equipped with a line head is used to record an image. As a result, it has been found that such a temperature control as to satisfy the relationship Tc>To is effective, where To (° C.) is the average temperature of an ink ejected from an overlapping-portion nozzle included in the overlapping portion of the nozzle array and Tc (° C.) is the average temperature of an ink ejected from a center-portion nozzle included in the center portion of the nozzle array. The inventors of the present invention suggest the following mechanisms for the reason of achieving such an effect.

When an ink is ejected while the temperature control is performed so as to satisfy the relationship "Tc>To", the following phenomenon is supposed to occur. The average temperature (Tc (° C.)) of an ink ejected from the center-portion nozzle is higher than the average temperature (To (° C.)) of an ink ejected from the overlapping-portion nozzle. Hence, the ink ejected from the center-portion nozzle has a lower viscosity than the viscosity of the ink ejected from the overlapping-portion nozzle. The ink ejected from the center-portion nozzle and having a lower viscosity more easily permeates in a recording medium, and this reduces the difference in permeation depth from the ink ejected from the overlapping-portion nozzle. A smaller difference in the ink permeation depth can be ascertained by actual observation of a cross section of a recorded product (recording medium). From the above result, it is supposed that the ink permeation depth can be controlled to be uniform and cockling can be suppressed independent of the nozzle positions.

(Ink Jet Recording Apparatus)

The ink jet recording apparatus to be used in the ink jet recording method of the invention is equipped with a line head. The line head has a plurality of recording element substrates each having a nozzle array comprised of a plurality of nozzles, which eject an aqueous ink, arranged in a predetermined direction, and the recording element substrates are arranged in the predetermined direction such that the recording element substrate constitutes an overlapping portion at which the terminal portion of the recording element substrate is overlapped with the terminal portion of adjacent recording element substrate in the predetermined direction. The ink jet recording apparatus further includes a unit of controlling a relationship between the average temperature To (° C.) of an aqueous ink ejected from an overlapping-portion nozzle and the average temperature Tc (° C.) of an aqueous ink ejected from a center-portion nozzle so as to satisfy the relationship, Tc>To. In the ink jet recording apparatus, the aqueous ink is ejected from the overlapping-portion nozzles while the nozzles are allocated to an adjacent recording element substrate. The ink jet recording apparatus of the invention will hereinafter be described in detail while referring to drawings.

Figure 1:
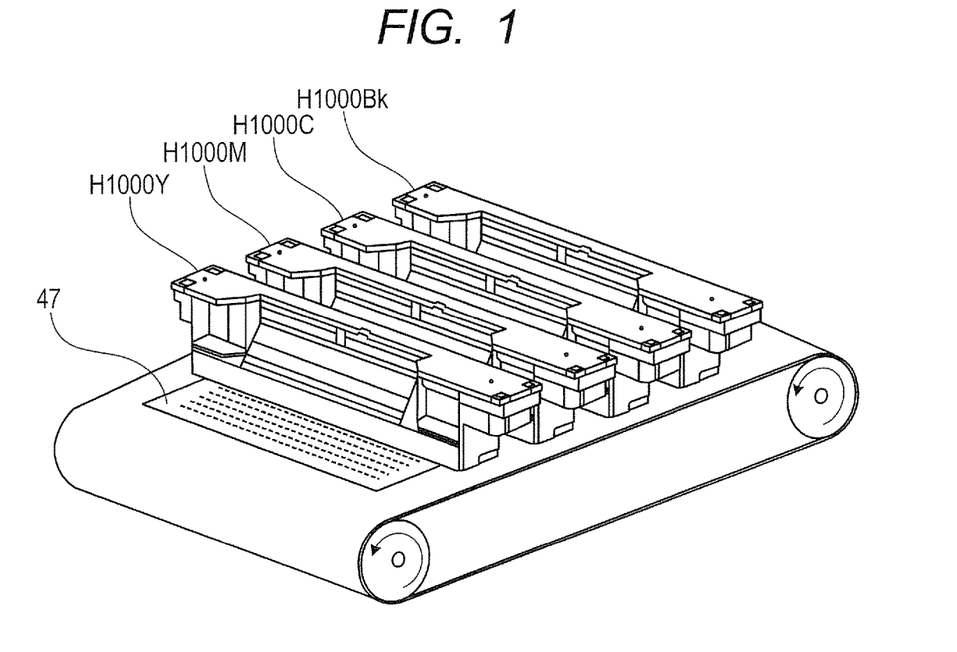
FIG. 1 is a conceptual diagram of recording an image by a line head.
Figure 2:
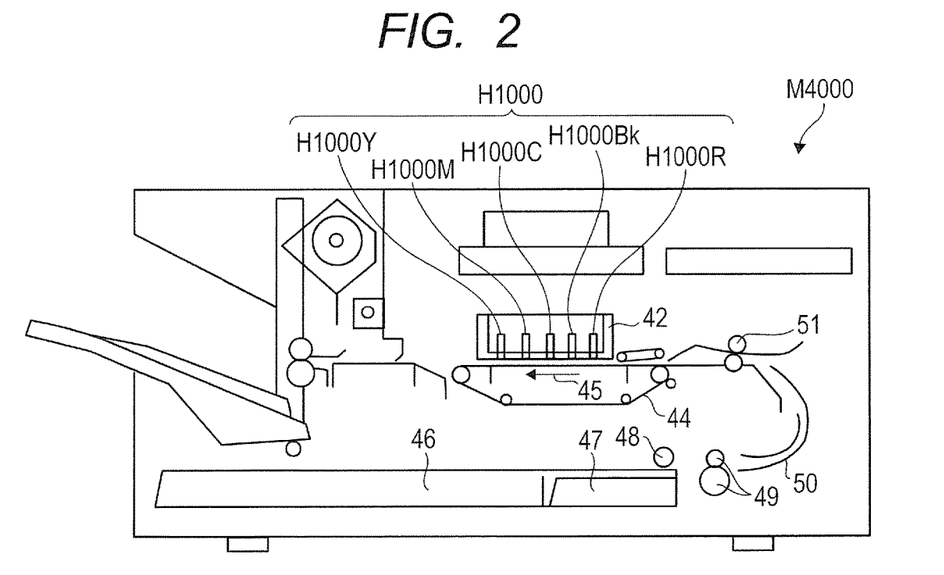
FIG. 2 is a schematic view showing one example of an ink jet recording apparatus.

FIG. 1 is a conceptual diagram of recording an image by a line head, and FIG. 2 is a schematic view showing one example of an ink jet recording apparatus. In a recording apparatus M4000 shown in FIG. 2, a line head (recording head H1000) is fixed to a recording apparatus body and a method of recording while conveying a recording medium 47 in a direction of an arrow 45 is adopted. The recording apparatus M4000 is equipped with, for example, a recording head H1000Y for yellow ink, a recording head H1000M for magenta ink, a recording head H1000C for cyan ink, and a recording head H1000Bk for black ink (FIG. 1).

The recording heads H1000Y to H1000R shown in FIG. 2 are fixed by a recording head holder 42 mounted in the recording apparatus M4000. FIGS. 1 and 2 show a structure in which yellow, magenta, cyan and black colors and a reaction liquid are ejected from recording heads, respectively. Needless to say, another structure may be employed in which an image is recorded by ejecting a plurality of inks and a reaction liquid from a plurality of nozzle arrays provided on one recording element substrate, respectively.

The ink jet recording apparatus may be equipped with a unit for applying, to a recording medium, a reaction liquid containing a component causing aggregation of a coloring material. Examples of the unit for applying the reaction liquid to a recording medium include a unit for applying the reaction liquid to a recording medium by a method of application and a unit for applying the reaction liquid to a recording medium by an ejection method. In the unit for applying the reaction liquid to a recording medium by a method of application, the reaction liquid is applied to the recording medium, for example, by using a conventionally known application member such as roller. In the unit for applying the reaction liquid to a reaction medium by an ejection method, the reaction liquid is applied to the recording medium, for example, by using an ejection device such as the line head for reaction liquid (recording head H1000R) as shown in FIG. 2. When four recording heads corresponding to inks of four colors are provided, respectively, as shown in FIG. 1, another unit for applying the reaction liquid to a recording medium can be provided. In the invention, it is preferred to apply the reaction liquid to a recording medium by a method of application or the like and then apply the inks, which have been ejected from the recording heads, to the recording medium.

A paper feed cassette 46 has therein one or more recording media 47 such as plain paper and it is detachably attached to the recording apparatus body. A pickup roller 48 is a member for sending one sheet on the topmost surface of the recording media 47 housed in the paper feed cassette 46. A conveying roller 49 is a member for conveying the recording media 47 sent by the pickup roller 48 to a conveying path 50. A conveying roller 51 arranged on the outlet side of the conveying path 50 is a member for conveying the recording media 47 toward the recording head H1000 while having the media on a conveying belt 44.

Figure 3A:
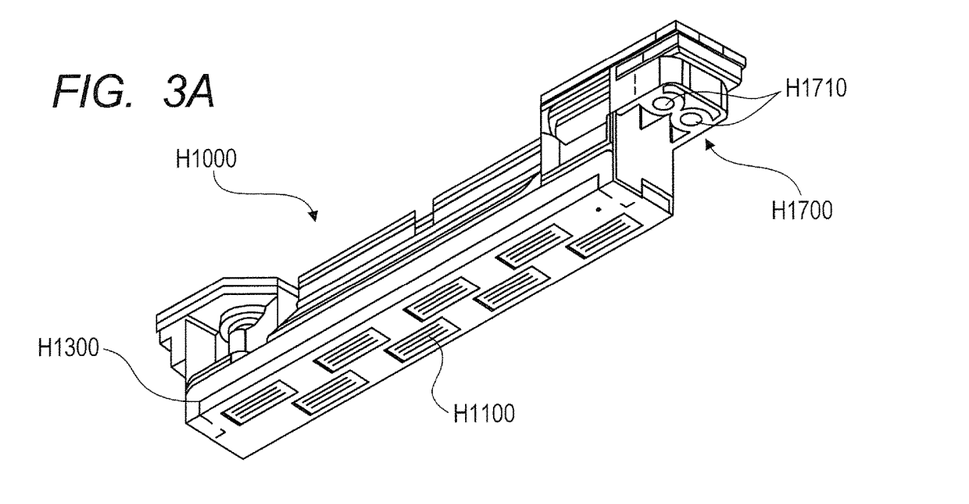
FIG. 3A is a perspective view and FIG. 3B is an exploded perspective view.
Figure 3B:
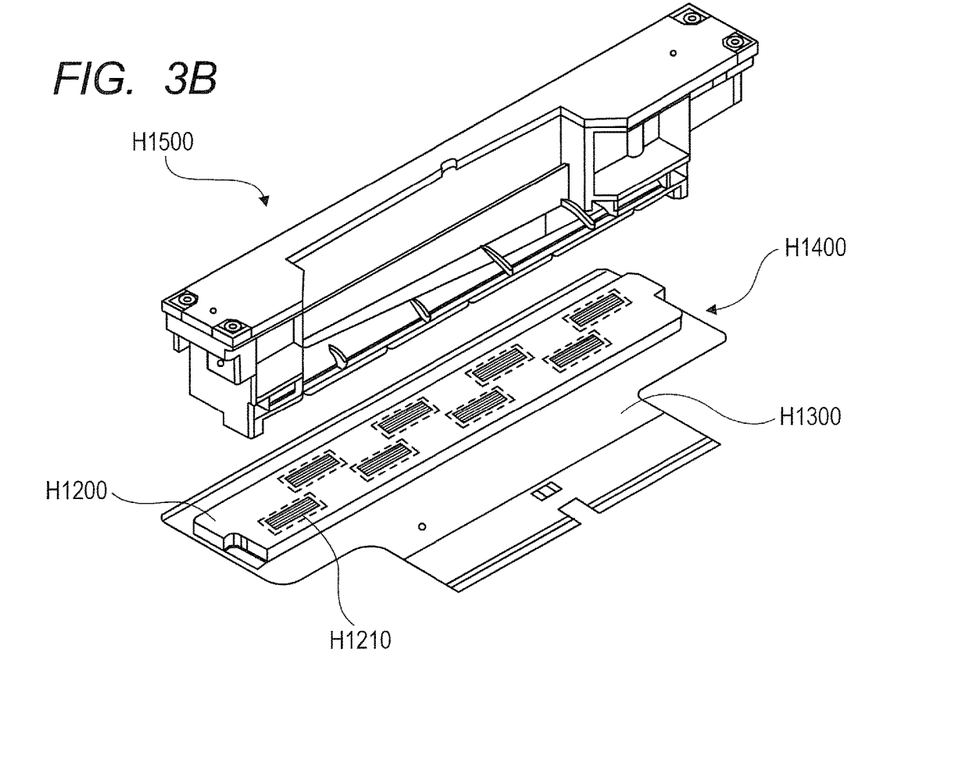

FIGS. 3A and 3B schematically show one example of a line head, in which FIG. 3A is a perspective view and FIG. 3B is an exploded perspective view. As shown in FIGS. 3A and 3B, the line head (recording head H1000) is equipped with a recording element unit H1400 and an ink supply unit H1500 which is a liquid supply unit for supplying an ink to the recording element unit H1400. The ink supply unit H1500 is equipped with a connection portion H1700 having therein a connection port H1710 to be connected with the outside for supplying the ink to an ink chamber (not shown) from the outside such as the recording apparatus. The recording element unit H1400 is comprised of a recording element substrate H1100, a support substrate H1200, and a wiring member H1300.

The support substrate H1200 is a member for holding and fixing the recording element substrate H1100 and the wiring member H1300 and it has therein an ink supply hole H1210 for supplying the recording element substrate H1100 with an ink supplied from the ink supply unit H1500. A plurality of recording element substrates H1100 are arranged and fixed on the main surface of the support substrate H1200 with predetermined positional accuracy. The plurality of recording element substrates H1100 is arranged in staggered manner on the support substrate H1200 such that their nozzles are arranged continuously along a direction of a nozzle array between the recording element substrates H1100 adjacent to each other. Thus, since the recording element substrates H1100 are arranged while overlapping the nozzles at the joint of the adjacent recording element substrates H1100 to enable correction of the influence of the misalignment of the recording element substrates on an image, a full line type recording head having a long recording width can be achieved.

The wiring member H1300 is electrically connected with each of the recording element substrates H1100 so as to send electrical signals or power for driving a recording element provided on the recording element substrate H1100 from the outside of the recording head H1000 (recording apparatus) to the recording element substrate H1100. As the wiring member H1300, a printed wiring board having flexibility such as flexible wiring board is used. The wiring member H1300 having flexibility is folded to facilitate electrical connection between the recording element substrate H1100 and the recording apparatus and fixed to the ink supply unit H1500.

Examples of an ink ejection system include a system of supplying an ink with dynamic energy and a system of supplying an ink with thermal energy. In the invention, a line head that ejects an ink by either of these systems is preferred. Specifically, a system of applying an ink with thermal energy is preferably used.

Figure 6:
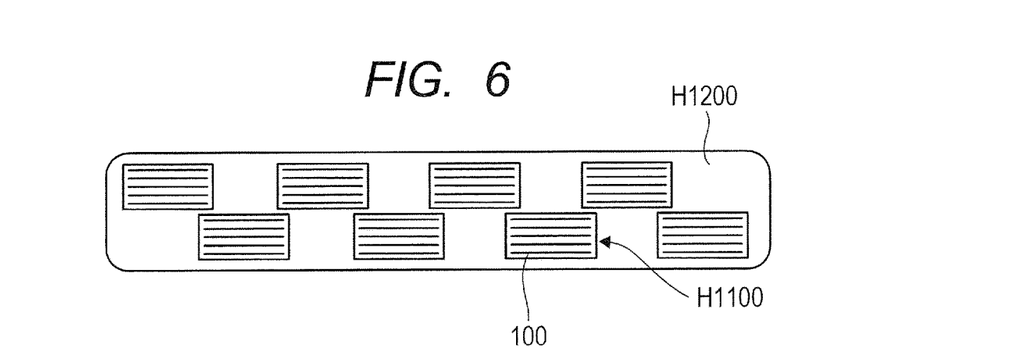
FIG. 6 is a schematic view showing one example of an arrangement mode of recording element substrates in a line head.
Figure 7:
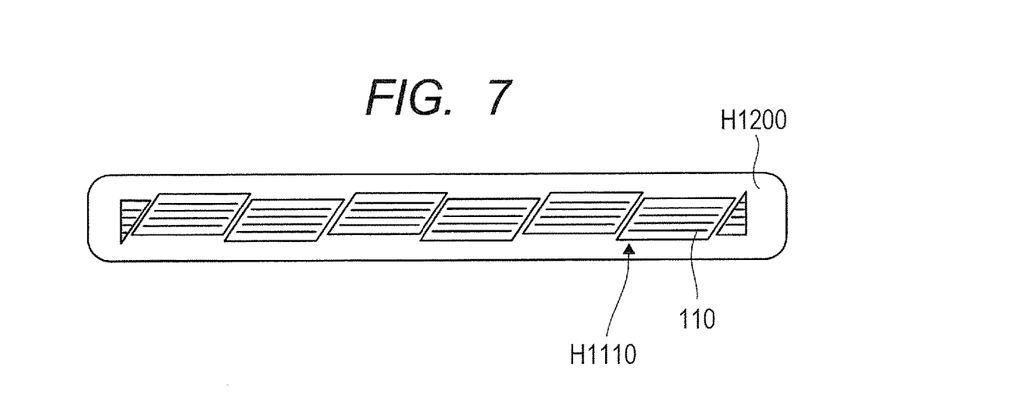
FIG. 7 is a schematic view showing another example of the arrangement mode of recording element substrates in a line head.

FIG. 6 is a schematic view showing one example of an arrangement mode of recording element substrates in a line head. As shown in FIG. 6, a line head constituting the ink jet recording apparatus of the invention is equipped with a plurality of recording element substrates H1100 each having nozzle arrays 100 comprised of a plurality of ink ejection nozzles arranged in a predetermined direction. The plurality of recording element substrates H1100 are arranged in the predetermined direction (direction same as the nozzle arrangement direction), such that the recording element substrates H1100 constitute an overlapping portion at which the terminal portion of the recording element substrate H1100 is overlapped with the terminal portion of adjacent recording element substrate H1100 in the predetermined direction and is held on a support substrate H1200. When focused on the terminal portions of the recording element substrates H1100, the terminal portions are overlapped with the terminal portions of adjacent recording element substrates H1100 in a direction intersecting with the predetermined direction (direction same as the nozzle arrangement direction), The arrangement mode of the recording element substrates is not particularly limited. Examples of the arrangement mode of the recording element substrates include a staggered arrangement as shown in FIG. and an inline arrangement of a plurality of recording substrates H1110 each having nozzle arrays 110, as shown in FIG. 7.

In the invention, an ink is ejected so as to satisfy the relationship, Tc>To, where To (° C.) is the average temperature of an ink ejected from overlapping-portion nozzles included in the overlapping portion of the nozzle array and Tc (° C.) is the average temperature of an ink ejected from center-portion nozzles included in the center portion of the nozzle array. Hence, the ink jet recording apparatus of the invention includes a unit for controlling the relationship between the average ink temperature To (° C.) and the average ink temperature Tc (° C.) (unit for controlling the ink temperature) so as to satisfy the above relationship.

The average temperature Tc (° C.) of the ink ejected from the center-portion nozzles can be set at a temperature applied to a common ink jet recording method. Specifically, by setting Tc (° C.) at 40° C. or more, the permeation of an ink can be sufficiently improved, and the cockling suppressive effect can be further improved. Hence, such a condition is preferred. Tc (° C.) is preferably 60° C. or less and more preferably 50° C. or less. The average temperature To (° C.) of the ink ejected from the overlapping-portion nozzles is preferably 20° C. or more and more preferably 25° C. or more and is preferably 40° C. or less and more preferably 35° C. or less. By controlling the ink temperatures so as to satisfy the relationship Tc−To≤10° C., the relationship of permeation of inks can be more appropriate, and the cockling suppressive effect can be further improved. Hence, such a condition is preferred. The relationship 5° C.≤Tc−To is more preferably satisfied.

Examples of the unit of controlling the average temperature of an ink ejected from center-portion nozzles and the average temperature of an ink ejected from overlapping-portion nozzles include an ink-temperature-controlling heater (sub-heater) provided on a line head and a heater for ink ejection. The sub-heater may be located at any position and can be located around a nozzle array on a recording element substrate. Alternatively, one or more sub-heaters can be located corresponding to a single ejection port (nozzle) included in a nozzle array. For temperature control (heating or warming) of an ink with a heater for ink ejection, an electric current can be repeatedly applied in such a way as not to eject an ink, for example. A sub-heater and a heater for ink ejection can be used in combination to control the average temperature of an ink. When used in combination, these heaters can be used separately. For example, one heater is used to heat an ink to a predetermined temperature, and then the other heater is used to warm the ink around an intended temperature. The ink temperature can be read by a temperature sensor provided on a recording head, for example.

The ejection amount of an ink can be set to an ejection amount applicable to a common ink jet recording method. Specifically, the ink ejection amount per nozzle is preferably 40.0 ng/dot or less, more preferably 10.0 ng/dot or less, and particularly preferably 5.9 ng/dot or less. By adjusting the ink ejection amount per nozzle within the above range, the coloring material in an ink is likely to be left in the vicinity of the surface of a recording medium. This can further improve the optical density of a recorded image. In addition, the ink permeation depth can be more uniform, and the cockling suppressive effect can be further improved. The ink ejection amount per nozzle is preferably 1.0 ng/dot or more.

Figure 4A:
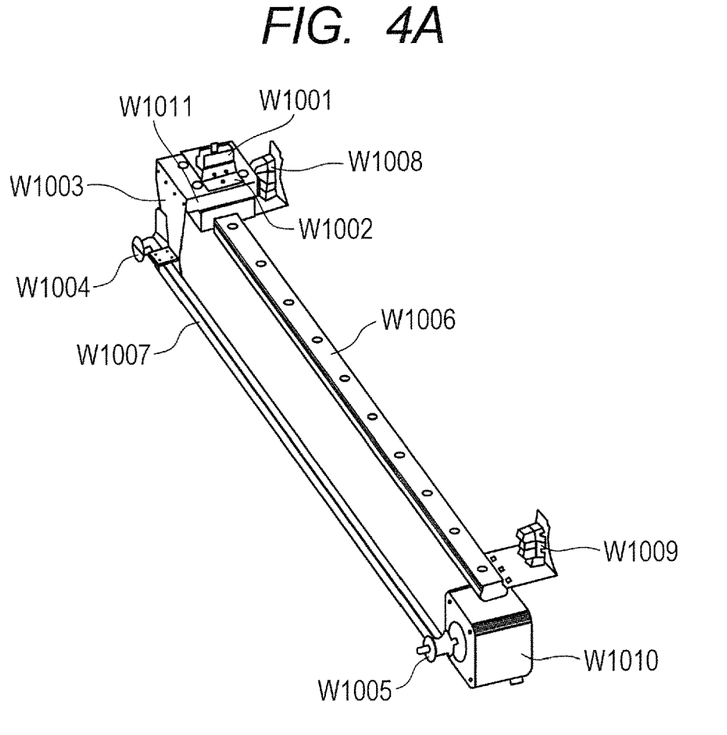
FIG. 4A is a perspective view and FIG. 4B is a schematic view.
Figure 4B:
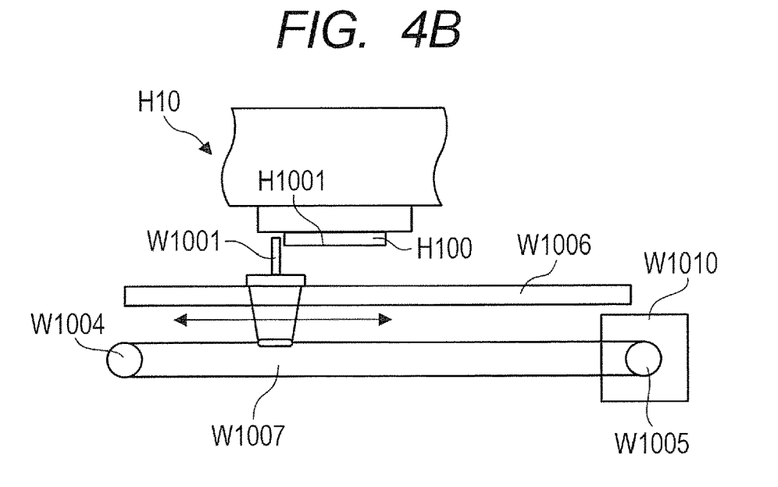

The ink jet recording apparatus to be used in the ink jet recording method of the invention may be equipped further with a recovery mechanism for recovering from firm adhesion of an ink to the ejection orifice of the line head or wetting of the surface of the ejection orifice. FIGS. 4A and 4B show one example of the wiping mechanism, in which FIG. 4A is a perspective view and FIG. 4B is a schematic view. As shown in FIGS. 4A and 4B, a wiper W1001 is held by a clip member W1002 and the clip member W1002 is held by a linking member W1003. The clip member W1002 is attached to a wipe base W1011 capable of travelling on a slide rail W1006. The wipe base W1011 can travel on the slide rail W1006, driven by a timing belt W1007 through the linking member W1003. The timing belt W1007 is supported by a driven pulley W1004 and a driving pulley W1005. To the driving pulley W1005, the shaft of a driving motor W1010 for driving the timing belt W1007 is linked. For controlling the position of the wiper W1001 at the time of a recovery operation, the slide rail W1006 has, at both ends thereof, photo sensors W1008 and W1009. At the time of the recovery operation by wiping, the wiper W1001 slides and moves by means of the slide rail W1006 and thereby, the wiper W1001 wipes the ejection orifice surface H1001 of a recording head H1000 while bending.

Figure 5:
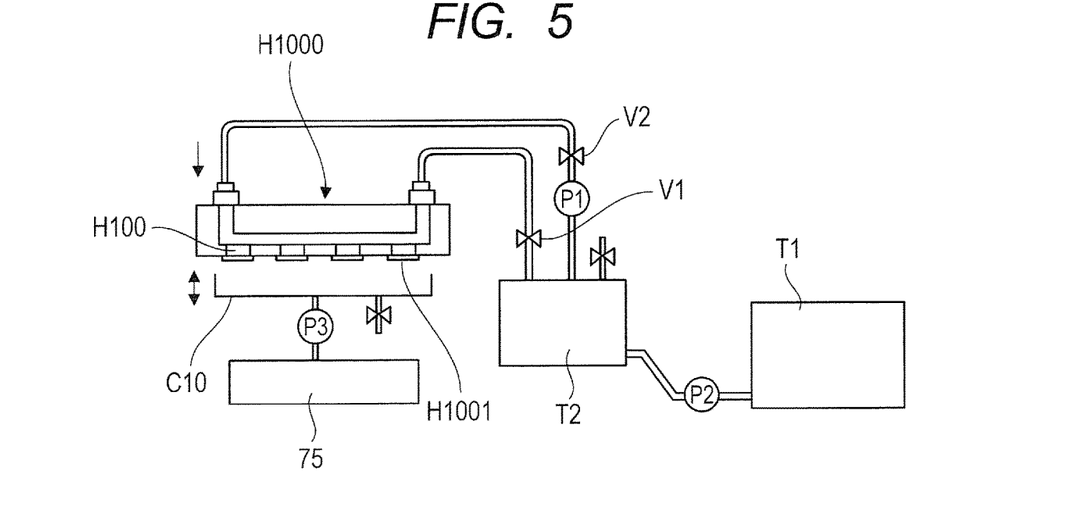
FIG. 5 is a schematic view showing one example of a mechanism for supplying a line head with an ink.

The ink jet recording apparatus to be used in a liquid ejection method of the invention may further be equipped with a mechanism of supplying the line head with a liquid, such as ink. FIG. 5 is a schematic view showing one example of a supply mechanism for supplying an ink to the line head. As shown in FIG. 5, the ink is supplied from a sub tank T2 to the line head H1000 with a pump P1. The ink overflowing from the line head H1000 is returned to the sub tank T2. A valve V1 is provided for switching between pressurization and release of pressure in an ink chamber inside the line head at the time of the recovery operation. At the time of recovery by pressurization, the valve V1 is closed and pressurization is performed with the pump P1 to remove some of bubbles from an ink supply path and an ink flow path. The liquid level of the ink in the sub tank T2 is constituted so that a water head difference with the ejection orifice surface of the line head H1000 is kept within a certain range, by which the negative pressure of the ejection orifice surface of the line head H1000 is kept within an appropriate range. When an amount of the ink in the sub tank T2 is not enough, an ink is delivered from a main tank T1 to the sub tank T2 with a pump P2. The temperature of the tanks and inks housed therein depends on the environmental temperature at which the ink jet recording apparatus is placed. For example, a temperature within a range of from 15° C. to 45° C. is preferred.

As a recording medium on which an image is to be recorded by the ink jet recording method of the invention, any media may be used. Among them, paper having permeability is preferred. Examples include recording media without a coating layer such as plain paper and non-coated paper and recording media having a coating layer such as glossy paper and art paper. In particular, recording media having a coating layer, such as glossy paper or art paper are preferred.

(Ink)

Components constituting an ink to be used in the ink jet recording method of the invention and physical properties of the ink will hereinafter be described in detail. The ink to be used in the invention is not necessarily a so-called "curable ink". The ink to be used in the invention therefore does not necessarily contain a compound such as polymerizable monomer which can be polymerized by application of external energy.

[Coloring Material]

The ink to be used in the ink jet recording method of the invention preferably contains a coloring material. As the coloring material, any of dyes and pigments can be used. Examples of the dye include dyes having an anionic group. As the dye, a compound having a phthalocyanine skeleton, an azo skeleton, a xanthene skeleton, an anthrapyridone skeleton, or the like can be used. Examples of the pigment include inorganic pigments and organic pigments. As the pigment, usable are resin-dispersion type pigments using a resin as a dispersant and self-dispersion type pigments (self-dispersible pigments) prepared by introducing a hydrophilic group to the surface of pigment particles. Specifically, an ink containing a pigment as the coloring material is preferably used. By using a pigment as the coloring material, solid-liquid separation of an ink adhering to a recording medium is accelerated, thus the pigment is likely to be left on the surface of the recording medium, and the optical density of a recorded image can be further increased. In addition, the pigment is left on the surface of a recording medium, and the solid-liquid separation helps only a liquid component (aqueous medium) to rapidly permeate into a recording medium, which is wetted uniformly. Hence, the cockling suppressive effect can be further improved. When a pigment is used as the coloring material, using a dispersion system not making use of a resin dispersant is preferred, with using a self-dispersible pigment being more preferred.

Examples of the resin-dispersed type pigments include resin-dispersed pigments using a polymer dispersant, microcapsule type pigments obtained by covering the surface of pigment particles with a resin, and resin-bound type pigments obtained by chemically binding a polymer-containing organic group to the surface of pigment particles. Pigments different in dispersion method may be used in combination. As the resin, acrylic resins having at least an anionic-group-having unit such as (meth)acrylic acid and an anionic-group-free unit such as a monomer having an aromatic ring or aliphatic group are preferred.

Examples of the self-dispersible type pigments include those obtained by binding an anionic group to the surface of pigment particles directly or via another atomic group. Examples of the anionic group include carboxylic acid group, sulfonic acid group, phosphoric acid group, and phosphonic acid group. Examples of the counter ion of the anionic group include cations such as hydrogen atom, alkali metals, ammonium, and organic ammoniums. The "other atomic group" has a function of a spacer between the surface of pigment particles and the ionic group and has preferably a molecular weight of 1000 or less. Examples of the other atomic group include alkylene groups having from about 1 to 6 carbon atoms, arylene groups such as phenylene and naphthylene, ester groups, imino groups, amide groups, sulfonyl groups, and ether groups. The other atomic group may be a combination of these groups.

The content (% by mass) of the coloring material in the ink is preferably 0.1% by mass or more to 15.0% by mass or less, more preferably 1.0% by mass or more to 10.0% by mass or less, each based on the total mass of the ink. Specifically, the content is particularly preferably 2.0% by mass or more to 10.0% by mass or less.

[Aqueous Medium]

The ink contains water as an aqueous medium. The water used is preferably deionized water (ion-exchanged water). The content (% by mass) of water in the ink is preferably 50.0% by mass or more to 95.0% by mass or less, more preferably 60.0% by mass or more to 95.0% by mass or less, each based on the total mass of the ink.

The ink may also contain a water-soluble organic solvent as the aqueous medium. As the water-soluble organic solvent, any of those ordinarily used for inks to be used in an ink jet recording method can be used. Specific examples of the water-soluble organic solvent include alkyl alcohols having from 1 to 4 carbon atoms, amides, ketones or ketoalcohols, ethers, polyalkylene glycols, glycols, alkylene glycols having an alkylene group with from 2 to 6 carbon atoms, alkyl ether acetates, alkyl ethers of a polyhydric alcohol, and nitrogenous compounds. These water-soluble organic solvents may be used either singly or in combination. The content (% by mass) of the water-soluble organic solvent in the ink is preferably 3.0% by mass or more to 50.0% by mass or less based on the total mass of the ink.

The term "water-soluble organic solvent" usually means a liquid, but a solid at 25° C. (normal temperature) is also embraced in it in the invention for the convenience sake because it becomes a liquid medium constituting an ink after dissolved in water. Specific examples of the water-soluble organic solvent which is widely used for inks and in solid form at 25° C. include 1,6-hexanediol, trimethylolpropane, ethylene urea, urea, and polyethylene glycol having a number-average molecular weight of 1,000.

[Surfactant]

The ink may contain a surfactant. The content (% by mass) of the surfactant in the ink is preferably 0.1% by mass or more to 5.0% by mass or less, more preferably 0.2% by mass or more to 3.0% by mass or less, each based on the total mass of the ink. Specific examples of the surfactant include hydrocarbon-based surfactants such as ethylene oxide adducts of acetylene glycol, polyethylene glycol alkyl ethers, and polyoxyethylene polyoxypropylene block copolymers, fluorine-based surfactants such as perfluoroalkyl ethylene oxide adducts, and silicone-based surfactants such as polyether-modified siloxane compounds. Of these, the nonionic surfactants are preferred. These surfactants may be used either singly or in combination.

[Other Components]

The ink may contain, in addition to the above-described components, various additives such as resin, pH regulator, rust preventive, antiseptic, antifungal agent, antioxidant, or reduction preventive in order to obtain an ink having desired physical property values if necessary.

[Dynamic Surface Tension of Ink]

The ink preferably has a dynamic surface tension of 30 mN/m or more at 25° C. When an ink has a dynamic surface tension of 30 mN/m or more at 25° C., the permeation of the ink and the optical density of a recorded image are in better balance. The dynamic surface tension of an ink is determined by a maximum bubble pressure method at a lifetime of 10 msec. The ink preferably has a dynamic surface tension of 50 mN/m or less at 25° C. The maximum bubble pressure method is a method in which a maximum pressure required for discharging a bubble formed at a tip of a probe (thin tube) immersed in a liquid to be measured is measured and the surface tension of the liquid is determined from the measured maximum pressure. The lifetime is a time from a point at which a fresh surface is formed after release of a bubble from a tip to a point at which a maximum bubble pressure is obtained (a point at which the curvature radius of a bubble becomes equal to the radius of the tip of the probe) when bubbles are formed at the tip of the probe in the maximum bubble pressure method.

[Static Surface Tension of Ink]

The ink preferably has a static surface tension of 55 mN/m or less at 25° C. The ink more preferably has a static surface tension of 15 mN/m or more and particularly preferably 25 mN/m or more at 25° C.

[Physical Properties of Ink]

The ink has preferably a viscosity at 25° C. of 1.0 mPa·s or more to 5.0 mPa·s or less, more preferably 1.0 mPa·s or more to 3.0 mPa·s or less. The ink has preferably a pH at 25° C. of 5 or more to 9 or less.

Examples

The invention will hereinafter be described in further detail by Examples and Comparative Examples. The invention is not restricted to or by the following Examples insofar as it does not depart from the gist of the invention. All designations of "part or parts" and "%" are on a mass basis unless otherwise specifically indicated.

<Preparation of Pigment Dispersion>

(Pigment Dispersion 1)

A styrene/acrylic acid copolymer (composition (molar) ratio=33:67) added as a water-soluble resin was neutralized with one neutralization equivalent of potassium hydroxide. The neutralized resin was dissolved in ion-exchanged water to prepare an aqueous solution of a resin dispersant having a resin content of 20.0%. The water-soluble resin used had a weight average molecular weight of 10,000 and an acid value of 200 mgKOH/g. A mixture of 15.0 parts of a pigment (carbon black), 30.0 parts of the aqueous solution of a resin dispersant, and 55.0 parts of water was poured in a sand grinder and was subjected to dispersion treatment for one hour. After removal of coarse particles by centrifugal separation treatment, the residue was pressure filtered through Micro Filter (product of Fujifilm) having a pore size of 3.0 µm. Then, an adequate amount of ion exchanged water was added to obtain Pigment Dispersion 1. The resulting Pigment Dispersion 1 had a pigment content of 15.0% and a resin dispersant content of 6.0%.

(Pigment Dispersion 2)

The same procedure as the preparation of Pigment Dispersion 1 was performed except that the pigment type was changed to C.I. Pigment Blue 15:3, giving Pigment Dispersion 2. The resulting Pigment Dispersion 2 had a pigment content of 15.0% and a resin dispersant content of 6.0%.

(Pigment Dispersion 3)

The same procedure as the preparation of Pigment Dispersion 1 was performed except that the pigment type was changed to C.I. Pigment Red 122, giving Pigment Dispersion 3. The resulting Pigment Dispersion 3 had a pigment content of 15.0% and a resin dispersant content of 6.0%.

(Pigment Dispersion 4)

The same procedure as the preparation of Pigment Dispersion 1 was performed except that the pigment type was changed to C.I. Pigment Yellow 74, giving Pigment Dispersion 4. The resulting Pigment Dispersion 4 had a pigment content of 15.0% and a resin dispersant content of 6.0%.

(Pigment Dispersion 5)

A solution prepared by dissolving 70.6 mmol of concentrated hydrochloric acid in 5.5 g of water was cooled at 5° C., and 9.8 mmol of 4-aminophthalic acid was added. A container containing the solution was placed in an ice bath and was stirred to be constantly maintained at 10° C. or less. To the solution, a solution prepared by dissolving 24.9 mmol of sodium nitrite in 9.0 g of water at 5° C. was added. After stirring for another 15 minutes, 6.0 g of a pigment was added under stirring. The pigment used was carbon black (trade name "BLACK PEARLS 880", manufactured by Cabot). The mixture was further stirred for 15 minutes, giving a slurry. The obtained slurry was filtered through a filter paper (trade name "Standard filter paper No. 2", manufactured by ADVANTEC). The product was thoroughly washed with water and dried in an oven at a temperature of 110° C., giving a self-dispersible pigment. Ion-exchanged water was used to adjust the pigment content, giving Pigment Dispersion 5. The resulting Pigment Dispersion 5 contained a self-dispersible pigment in which a phthalic acid group including sodium as a counter ion was bonded to the particle surface and had a pigment content of 15.0%.

<Aqueous Dye Solution>

A 15.0% aqueous solution of C.I. Direct Black 195 was used as an "aqueous dye solution".

<Preparation of Ink>

Components (unit: %) listed in Table 1 were mixed and stirred sufficiently. The resulting mixture was then pressure filtered through a cellulose acetate filter having a pore size of 1.20 µm (product of Advantec) to prepare each ink. The surface tension at 25° C. of the ink thus prepared is shown in the lower portion of Table 1. The surface tension of the ink was measured using an automatic surface tensiometer ("CBVP-Z", trade name; product of Kyowa Interface Science) in an environment with a temperature of 25° C. and a humidity of 50%. In Table 1, "Surfynol 104" (product of Nissin Chemical Industry Co., Ltd.) is a trade name of a nonionic surfactant.

TABLE 1

| | Composition and properties of ink | | | | | | | | |
|---|---|---|---|---|---|---|---|---|---|
| | Ink | | | | | | | | |
| | 1 | 2 | 3 | 4 | 5 | 6 | 7 | 8 | 9 |
| Pigment dispersion 1 | 20.0 | | | | | | 20.0 | 20.0 | 20.0 |
| Pigment dispersion 2 | | 20.0 | | | | | | | |
| Pigment dispersion 3 | | | 20.0 | | | | | | |
| Pigment dispersion 4 | | | | 20.0 | | | | | |
| Pigment dispersion 5 | | | | | 20.0 | | | | |
| Dye aqueous solution | | | | | | 20.0 | | | |
| Diethylene glycol | 5.0 | 5.0 | 5.0 | 5.0 | 5.0 | 5.0 | 5.0 | 5.0 | 5.0 |
| 2-Pyrrolidone | 5.0 | 5.0 | 5.0 | 5.0 | 5.0 | 5.0 | 5.0 | 5.0 | 5.0 |
| Surfynol 104 | 0.3 | 0.3 | 0.3 | 0.3 | 0.3 | 0.3 | 1.0 | 0.6 | 0.1 |
| Ion-exchanged water | 69.7 | 69.7 | 69.7 | 69.7 | 69.7 | 69.7 | 69.0 | 69.4 | 69.9 |
| Dynamic surface tension (mN/m) | 40 | 40 | 40 | 40 | 40 | 40 | 28 | 30 | 50 |

<Evaluation>
(Composition of Head)

The following thermal ink jet type heads 1 to 8 which ejected an ink by application of thermal energy were provided. The heads 1 to 8 each have a nozzle density of 600 dpi per nozzle array, and two nozzle arrays per ink color.

[Head 1]

Figure 9:
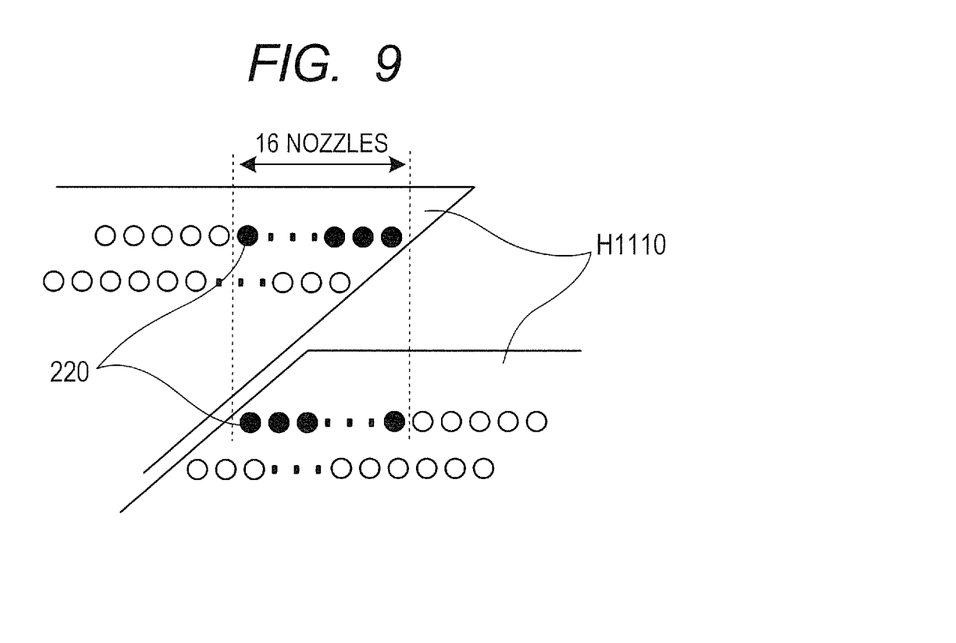
FIG. 9 is a schematic view showing an arrangement mode of nozzles of recording element substrates constituting a line head 3.

This is a line head prepared by arranging a plurality of recording element substrates H1110 in an inline manner as shown in FIG. 7. As shown in FIG. 9, the number of overlapping-portion nozzles 220 per nozzle array is 16, and the ink ejection amount per nozzle is 5.0 ng/dot.

[Head 2]

Figure 8:
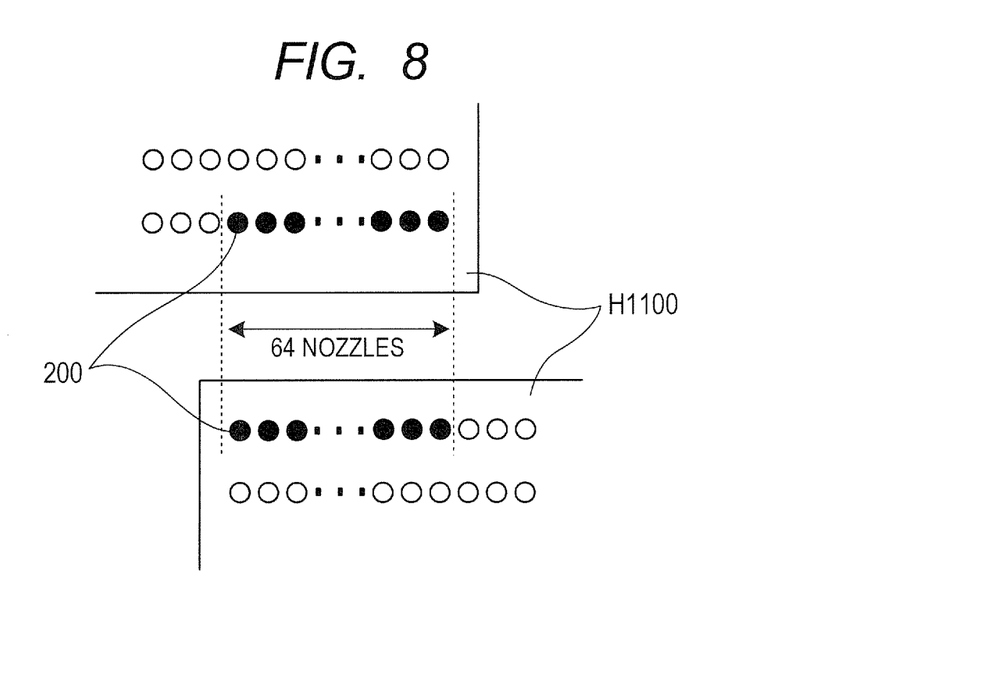
FIG. 8 is a schematic view showing an arrangement mode of nozzles of recording element substrates constituting a line head 1.

This is a line head prepared by arranging a plurality of recording element substrates H1100 in a staggered manner as shown in FIG. 6. As shown in FIG. 8, the number of overlapping-portion nozzles 200 per nozzle array is 64, and the ink ejection amount per nozzle is 5.0 ng/dot.

[Head 3]

This is a line head prepared by arranging a plurality of recording element substrates H1110 in an inline manner as shown in FIG. 7. As shown in FIG. 9, the number of overlapping-portion nozzles per nozzle array is 16, and the ink ejection amount per nozzle is 5.9 ng/dot.

[Head 4]

This is a line head prepared by arranging a plurality of recording element substrates H1110 in an inline manner as shown in FIG. 7. As shown in FIG. 9, the number of overlapping-portion nozzles per nozzle array is 16, and the ink ejection amount per nozzle is 7.5 ng/dot.

[Head 5]

This is a line head prepared by arranging a plurality of recording element substrates H1110 in an inline manner as shown in FIG. 7. As shown in FIG. 9, the number of overlapping-portion nozzles per nozzle array is 16, and the ink ejection amount per nozzle is 30.0 ng/dot.

[Head 6]

This is a serial head making use of the recording element substrates constituting the head 2.

[Head 7]

This is a line head prepared by arranging a plurality of recording element substrates H1100 in a staggered manner as shown in FIG. 6. The number of overlapping-portion nozzles per nozzle array is 0, and the ink ejection amount per nozzle is 5.0 ng.

[Head 8]

This is a line head prepared by arranging a plurality of recording element substrates H1110 in an inline manner as shown in FIG. 7. The number of overlapping-portion nozzles per nozzle array is 0, and the ink ejection amount per nozzle is 5.0 ng.

The constitution of each of the heads 1 to 8 is shown in Table 2.

TABLE 2

| | Constitution of head | | | | | | | |
|---|---|---|---|---|---|---|---|---|
| | 1 | 2 | 3 | 4 | 5 | 6 | 7 | 8 |
| Kind | Line head | Line head | Line head | Line head | Line head | Serial head | Line head | Line head |
| Arrangement mode of recording element substrates | Inline | Staggered | Inline | Inline | Inline | — | Staggered | Inline |
| The number of nozzles per nozzle array | 512 | 512 | 512 | 512 | 512 | 512 | 512 | 512 |
| The number of overlapping-portion nozzles per nozzle array | 16 | 64 | 16 | 16 | 16 | — | 0 | 0 |
| The number of center-portion nozzles per nozzle array | 256 | 256 | 256 | 256 | 256 | 256 | 256 | 256 |
| Ink ejection amount per nozzle (ng/dot) | 5.0 | 5.0 | 5.9 | 7.5 | 30.0 | 5.0 | 5.0 | 5.0 |

<Image Recording, Evaluation>

For evaluation of Examples 1 to 19, Comparative Examples 1 to 5, and Reference Examples 3 and 4, ink jet recording apparatuses having a constitution as shown in FIG. 2 and equipped with the corresponding heads 1 to 5, 7, and 8 as a line head were used. The heads are fixed to the corresponding ink jet recording apparatuses. These ink jet recording apparatuses each recorded an image by a single relative scanning of the head on a recording medium. After an ink storage portion was filled with each of the inks prepared above, the ink was delivered to the head with a pump. With the apparatus, a recording medium was conveyed at a speed of 8 inch/sec to record a solid image having a predetermined size in conditions of applying 20 ng of ink droplets to a 1/600 inch×1/600 inch unit region.

Evaluation was made in Reference Examples 1 and 2 by using an ink jet recording apparatus having a constitution similar to that shown in FIG. 2 except for the use of the head 6 as a serial head instead of the line head. This ink jet recording apparatus records an image in a unit region on a recording medium by scanning of a recording head twice. With the apparatus, the head was swept at a speed of 8 inch/sec to record a solid image having a predetermined size in conditions of applying 20 ng of ink droplets to a 1/600 inch×1/600 inch unit region.

As the recording medium, plain paper (trade name: PB-PAPER, manufactured by Canon) was used. The temperature of the ink was controlled by applying a current to the heater of the line head to such an extent as not eject the ink while the temperature was read by a diode sensor provided on the head. Examples 1 to 19 and Comparative Examples 2 to 5 were controlled so that the overlapping-portion nozzles ejected an ink while the nozzles were allocated to nozzles arranged in a staggered manner on adjacent recording element substrates. Comparative Example 1 was controlled so as to eject an ink only from nozzles on recording element substrates at the upstream side in the recording medium conveyance direction. In Reference Examples 3 and 4, a head having no overlapping-portion nozzle was used.

Combinations of the recording head, ink, and average ink temperatures Tc and To are shown in Table 3. The average ink temperature Tc (° C.) is an average temperature of the inks ejected from center-portion nozzles within a range of 256 nozzles from the center of the nozzle array. The average ink temperature To (° C.) is an average temperature of the inks ejected from overlapping-portion nozzles arranged in the overlapping portion, of the nozzles included in the nozzle array.

(Evaluation of Cockling)

A solid image 18 cm in a line head longer direction (recording head scanning direction for a serial head) and 2 cm in a paper feeding direction was recorded. The deformation (cockling) of a recording medium was observed 30 seconds after the completion of recording, and the cockling was evaluated on the basis of the following criteria. In the following criteria, "AA", "A", and "B" were regarded as an acceptable level, and "C" was regarded as an unacceptable level. The evaluation results are shown in Table 3.

AA: No cockling was observed.

A: Almost no cockling was observed.

B: Cockling was observed in a small area on a solid image.

C: Cockling was observed over the entire solid image.

(Evaluation of Optical Density)

A solid image 3 cm in a line head longer direction (recording head scanning direction for a serial head) and 3 cm in a paper feeding direction was recorded, and then the recorded product was dried in an environment at 25° C. and at a relative humidity of 55% for 24 hours. A fluorescent spectrodensitometer (trade name "FD-7", manufactured by KONICA MINOLTA JAPAN, INC.) was used to determine the optical density of the solid image in a condition of a visual field of 2° with a D50 light source, and the optical density was evaluated on the basis of the following criteria (values in parentheses are criteria for color inks). In the following criteria, "A" and "B" were regarded as an acceptable level, and "C" was regarded as an unacceptable level. The evaluation results are shown in Table 3.

A: The optical density was not less than 1.2 (not less than 1.0).

B: The optical density was not less than 1.0 and less than 1.2 (not less than 0.8 and less than 1.0).

C: The optical density was less than 1.0 (less than 0.8).

TABLE 3

Conditions and Results of evaluation

| | | | Evaluation conditions | | | | Evaluation results | |
|---|---|---|---|---|---|---|---|---|
| | | Head | Nozzle allocation in overlapping portion | Average ink temperature Tc (° C.) | Average ink temperature To (° C.) | Ink | Cockling | Optical density |
| Example | 1 | 1 | Allocated | 42 | 35 | 1 | AA | A |
| | 2 | 2 | Allocated | 42 | 35 | 1 | AA | A |
| | 3 | 1 | Allocated | 42 | 35 | 2 | AA | A |
| | 4 | 1 | Allocated | 42 | 35 | 3 | AA | A |
| | 5 | 1 | Allocated | 42 | 35 | 4 | AA | A |
| | 6 | 1 | Allocated | 42 | 35 | 5 | AA | A |
| | 7 | 1 | Allocated | 42 | 35 | 6 | B | A |
| | 8 | 3 | Allocated | 42 | 35 | 1 | AA | A |
| | 9 | 4 | Allocated | 42 | 35 | 1 | B | B |
| | 10 | 5 | Allocated | 42 | 35 | 1 | B | B |
| | 11 | 1 | Allocated | 42 | 35 | 7 | A | B |
| | 12 | 1 | Allocated | 42 | 35 | 8 | AA | A |
| | 13 | 1 | Allocated | 42 | 35 | 9 | AA | A |
| | 14 | 1 | Allocated | 35 | 28 | 1 | A | A |
| | 15 | 1 | Allocated | 40 | 33 | 1 | AA | A |
| | 16 | 1 | Allocated | 42 | 37 | 1 | AA | A |
| | 17 | 1 | Allocated | 45 | 35 | 1 | AA | A |

TABLE 3-continued

Conditions and Results of evaluation

| | | Head | Nozzle allocation in overlapping portion | Average ink temperature Tc (° C.) | Average ink temperature To (° C.) | Ink | Cockling | Optical density |
|---|---|---|---|---|---|---|---|---|
| | 18 | 1 | Allocated | 45 | 30 | 1 | A | A |
| | 19 | 4 | Allocated | 35 | 20 | 7 | B | B |
| Comp. Ex. | 1 | 1 | Not allocated | 42 | 35 | 1 | C | A |
| | 2 | 1 | Allocated | 40 | 45 | 1 | C | A |
| | 3 | 1 | Allocated | 40 | 45 | 2 | C | A |
| | 4 | 1 | Allocated | 40 | 45 | 3 | C | A |
| | 5 | 1 | Allocated | 40 | 45 | 4 | C | A |
| Ref. Ex. | 1 | 6 | — | 42 | 35 | 1 | A | A |
| | 2 | 6 | — | 40 | 45 | 1 | A | A |
| | 3 | 7 | — | 42 | 35 | 1 | * | A |
| | 4 | 8 | — | 42 | 35 | 1 | * | A |

In Comparative Example 1, the overlapping-portion nozzles were not allocated for the adjacent recording element substrates, and thus some streaks were observed in the solid image. In Reference Examples 1 and 2, multipath recording was performed, and thus no cockling was observed independent of temperature control, but the recording took twice as long as Examples. In Reference Examples 3 and 4, no cockling occurs due to the absence of a joint portion, and thus the cockling evaluation was not performed, but streaks were observed in the solid image due to the absence of a joint portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091054, filed May 1, 2017, and Japanese Patent Application No. 2018-062012, filed Mar. 28, 2018, which are hereby incorporated by reference herein in their entirety.

What is claimed is:

1. An ink jet recording method in which an image is recorded on a recording medium using an ink jet recording apparatus equipped with a line head, wherein the line head comprises a plurality of recording element substrates each having a nozzle array comprised of a plurality of nozzles, which eject an aqueous ink, arranged in a predetermined direction, the recording element substrates being arranged in the predetermined direction such that each of the recording element substrates constitutes an overlapping portion at which a terminal portion of the recording element substrate is overlapped with a terminal portion of an adjacent recording element substrate in the predetermined direction, the method comprising:
setting an average temperature To (° C.) of an aqueous ink ejected from an overlapping-portion nozzle included in the overlapping portion of the nozzle array and an average temperature Tc (° C.) of an aqueous ink ejected from a center-portion nozzle included in a center portion of the nozzle array so as to satisfy a relationship of Tc>To,
wherein the aqueous ink is ejected from the overlapping-portion nozzles while the nozzles are allocated to an adjacent recording element substrate.

2. The ink jet recording method according to claim 1, wherein the aqueous ink comprises a pigment as a coloring material.

3. The ink jet recording method according to claim 1, wherein an ejection amount of the aqueous ink per nozzle is 5.9 ng/dot or less.

4. The ink jet recording method according to claim 1, wherein the aqueous ink has a dynamic surface tension of 30 mN/m or more at 25° C.

5. The ink jet recording method according to claim 4, wherein the aqueous ink has a surface tension at 25° C. of 50 mN/m or less.

6. The ink jet recording method according to claim 1, wherein the average temperature Tc (° C.) of the aqueous ink ejected from the center-portion nozzle is 40° C. or more.

7. The ink jet recording method according to claim 6, wherein, in the setting, the average temperature Tc (° C.) is adjusted to 60° C. or less.

8. The ink jet recording method according to claim 1, wherein the average temperature To (° C.) of the aqueous ink ejected from the overlapping-portion nozzle and the average temperature Tc (° C.) of the aqueous ink ejected from the center-portion nozzle satisfy a relationship of Tc−To≤10.

9. The ink jet recording method according to claim 1, wherein the recording medium has a coating layer.

10. The ink jet recording method according to claim 1, wherein the recording medium has no coating layer.

11. The ink jet recording method according to claim 1, wherein the aqueous ink comprises a surfactant.

12. The ink jet recording method according to claim 1, wherein, in the setting, the average temperature To (° C.) is adjusted to 20° C. or more to 40° C. or less.

13. The ink jet recording method according to claim 1, wherein the line head ejects the aqueous ink by supplying the aqueous ink with thermal energy.

14. The ink jet recording method according to claim 1, wherein the plurality of recording element substrates are arranged in a staggered manner or in an inline manner.

15. The ink jet recording method according to claim 1, wherein the average temperature Tc is set by one of (i) an ink-temperature-controlling heater provided on the line head, and (ii) supplying an ink ejection heater with an electrical current in such a way as not to eject the aqueous ink.

16. The ink jet recording method according to claim 1, wherein the aqueous ink comprises a coloring material selected from the group consisting of a dye and a pigment.

17. The ink jet recording method according to claim 16, wherein the pigment comprises at least one of a self-dispersible pigment and a resin dispersed-pigment.

18. An ink jet recording apparatus for use in performing an ink jet recording method, the ink jet recording apparatus comprising:

a line head that includes a plurality of recording element substrates each having a nozzle array comprised of a plurality of nozzles, which eject an aqueous ink, arranged in a predetermined direction, the recording element substrates being arranged in the predetermined direction such that each of the recording element substrates constitutes an overlapping portion at which a terminal portion of the recording element substrate is overlapped with a terminal portion of an adjacent recording element in substrate in the predetermined direction; and a control unit configured to control a relationship between an average temperature To (° C.) of an aqueous ink ejected from an overlapping-portion nozzle included in the overlapping portion of the nozzle array and an average temperature Tc (° C.) of an aqueous ink ejected from a center-portion nozzle included in a center portion of the nozzle array so as to satisfy a relationship of Tc>To.

* * * * *